(12) United States Patent
Kojima et al.

(10) Patent No.: US 8,536,809 B2
(45) Date of Patent: Sep. 17, 2013

(54) CONTROL DEVICE FOR VEHICLE ELECTRIC DRIVE MOTOR AND VEHICLE WITH THE SAME

(75) Inventors: Takao Kojima, Hitachinaka (JP); Atsushi Yokoyama, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 87 days.

(21) Appl. No.: 13/364,918

(22) Filed: Feb. 2, 2012

(65) Prior Publication Data

US 2012/0200241 A1 Aug. 9, 2012

(30) Foreign Application Priority Data

Feb. 4, 2011 (JP) ................................. 2011-022919

(51) Int. Cl.
*H02P 6/08* (2006.01)

(52) U.S. Cl.
USPC ........... 318/139; 320/134; 320/144; 320/153; 180/65.21; 180/65.31

(58) Field of Classification Search
USPC ................ 318/139–158, 400.02–400.09, 634
See application file for complete search history.

(56) References Cited

U.S. PATENT DOCUMENTS

| 7,268,441 | B2 * | 9/2007 | Asao et al. ............... 318/400.09 |
| 8,140,280 | B2 * | 3/2012 | Kasai ............................... 702/63 |
| 2002/0195288 | A1 * | 12/2002 | Komiyama et al. .......... 180/65.4 |
| 2008/0265809 | A1 * | 10/2008 | Ol et al. ........................ 318/139 |
| 2010/0090629 | A1 * | 4/2010 | Tang ........................ 318/400.09 |
| 2010/0270955 | A1 * | 10/2010 | Yamakawa et al. ........... 318/139 |

FOREIGN PATENT DOCUMENTS

| JP | 2001-197607 A |   | 7/2001 |
| JP | 2001197607 A | * | 7/2001 |

* cited by examiner

*Primary Examiner* — Eduardo Colon Santana
*Assistant Examiner* — Said Bouziane
(74) *Attorney, Agent, or Firm* — Crowell & Moring LLP

(57) ABSTRACT

A controller for vector-controlled motor of vehicle judges whether a battery needs to be warmed up in accordance with an output of a battery temperature sensor, and when the battery needs to be warmed up, in situation (i) where the vehicle is stopped, sets a q-axis current value of the motor at zero, or when a brake is released from the situation (i), sets a q-axis current at a value corresponding to a drive torque for a vehicle creep operation, and sets a d-axis current at a value for battery warm-up. When the battery needs to be warmed up in situation (ii) where the vehicle is running, the controller sets a q-axis current at a value corresponding to a drive torque of vehicle running and sets a d-axis current at a value for the battery warm-up in relation to the q-axis current value.

8 Claims, 6 Drawing Sheets

| BATTERY TEMPERATURE \ DRIVE TORQUE | D0.0 | D0.1 | ... | D1 | ... | D2 | ... | D3 | ... Dn |
|---|---|---|---|---|---|---|---|---|---|
| T1 | $Id1_0$ | $Id1_1$ | ... | $Id1_{10}$ | ... | $Id1_{20}$ | ... | $Id1_{30}$ | ... $Id1_n$ |
| | $Iq1_0$ | $Iq1_1$ | ... | $Iq1_{10}$ | ... | $Iq1_{20}$ | ... | $Iq1_{30}$ | ... $Iq1_n$ |
| T2 | $Id2_0$ | $Id2_1$ | ... | $Id2_{10}$ | ... | $Id2_{20}$ | ... | $Id2_{30}$ | ... $Id2_n$ |
| | $Iq2_0$ | $Iq2_1$ | ... | $Iq2_{10}$ | ... | $Iq2_{20}$ | ... | $Iq2_{30}$ | ... $Iq2_n$ |
| T3 | $Id3_0$ | $Id3_1$ | ... | $Id3_{10}$ | ... | $Id3_{20}$ | ... | $Id3_{30}$ | ... $Id3_n$ |
| | $Iq3_0$ | $Iq3_1$ | ... | $Iq3_{10}$ | ... | $Iq3_{20}$ | ... | $Iq3_{30}$ | ... $Iq3_n$ |
| ⋮ Tn | ⋮ $Idn_0$ | ⋮ $Idn_1$ | ... | ⋮ $Idn_{10}$ | ... | ⋮ $Idn_{20}$ | ... | ⋮ $Idn_{30}$ | ⋮ ... $Idn_n$ |
| | ⋮ $Iqn_0$ | ⋮ $Iqn_1$ | ... | ⋮ $Iqn_{10}$ | ... | ⋮ $Iqn_{20}$ | ... | ⋮ $Iqn_{30}$ | ⋮ ... $Iqn_n$ |

CONTROL DEVICE FOR VEHICLE ELECTRIC DRIVE MOTOR AND VEHICLE WITH THE SAME

CLAIM OF PRIORITY

The present application claims priority from Japanese application serial no. 201122919, filed on Feb. 4, 2011, the content of which is hereby incorporated by reference into this application.

FIELD OF THE INVENTION

The present invention relates to a control device for vehicle electric drive motor and a vehicle with the same (e.g., electric vehicle or hybrid vehicle). More specifically, the present invention relates to a motor control device for controlling electrical power supplied from a battery to a vector-controlled drive motor.

BACKGROUND OF THE INVENTION

It is conventionally known that a chargeable and dischargeable secondary battery (hereinafter referred to as the battery) is used as a motor power supply for electric vehicle and hybrid vehicle which use an electric drive motor as a vehicle drive source. Decrease of temperature in the battery deteriorates its charge-discharge characteristics. Therefore, it is preferable to warm up the battery when a vehicle is in a cold start state, namely, when the vehicle is restarted after long hours of rest at a place where outdoor temperature is low, for instance, in winter or in cold climates.

As a prior art for battery warm-up, for example in a hybrid vehicle with an internal combustion engine and an electric drive motor as vehicle drive sources, JP 2001197607A (Patent Document 1) discloses that, when the battery is required to be warmed up, the warm-up for the battery is executed by feeding a motor driving current (a so-called d-axis current or magnetic flux component current) through the electric drive motor in only d-axis by using vector control of an electric drive motor-control device. The d-axis current is a current flowing in a direction of strengthening a magnetic flux of a permanent magnet of a motor rotor. In other words, according to such a technique, electrical power of the battery is consumed without rotating the electric drive motor and thereby can warm up the battery by allowing the battery to discharge for heat generation purposes. The prior art is to be used for only hybrid vehicle which has the two of an electric drive motor and an internal combustion engine as drive sources of the vehicle and is capable of running by at least one of these two drive sources. That is, in the prior art, the battery is warmed up by feeding the d-axis current for vector control through the electric drive motor, while the internal combustion engine is warmed up by its own power, and thereby a vehicle driving with the internal combustion engine warm-up and the battery warm-up are performed at the same time.

Meanwhile, the battery warm-up operation (cold start operation) described in Patent Document 1 is not applicable for so-called electric vehicles which uses only an electric drive motor as a vehicle drive source. The reason is that Patent document 1 is predicated on using the two of the internal combustion engine operation by itself and the battery warm-up operation by feeding the d-axis current for the electric drive motor during a cold start of vehicle. More in detail, if adopting the technology of Patent Document 1 to the electric vehicle, only the d-axis current for vector control is since fed through the electric drive motor during a cold start operation (in a situation where battery warm-up is required), it is difficult to perform both the vehicle driving mode and the battery warm-up mode by using the electric motor at the same time. Namely, if adopting the technology of Patent Document 1 to the electric vehicle, the battery warm-up technology is applicable to a situation where the vehicle is stopped, but, in a driving mode (in a mode in which a required drive torque for the motor is generated through an accelerator) at a vehicle cold start, required is since a q-axis current (torque component current), it is difficult to make a situation of using only the d-axis current for the battery warm-up operation. On the other hand, when considering as to the hybrid vehicle, the vehicle is driven exclusively by the internal combustion engine during the battery warm-up operation while only the d-axis current is fed to the electric drive motor (the q-axis current is zero so that the drive motor does not rotate). Consequently, from the view-point of environmental considerations such as emissions reduction, the hybrid vehicle does not make full use of its abilities.

The present invention is invented in view of the above circumstances, and its object is to provide a control device for vehicle electric drive motor capable of addressing the above-described matters thereby to realize a speedup of battery warm-up and take the environmental considerations into account regardless of an electric vehicle or a hybrid vehicle. The present invention also is to provide a vehicle with such a control device for an electric motor as vehicle drive motor.

SUMMARY OF THE INVENTION

To realize the abovementioned object, the present invention basically provides the following control device for vehicle electric drive motor and vehicle (e.g., electric vehicle or hybrid vehicle) with the control device.

(1) The control device for vehicle electric drive motor is used for vector control of a vehicle electric drive motor.

The control device comprises a controller that generates a motor drive signal of vector control for the motor in accordance with a required drive torque, and an inverter that controls electrical power supplied from a battery as an electrical power source to the motor in accordance with the motor drive signal. The controller is configured to judge whether the battery needs to be warmed up in accordance with an output of a battery temperature sensor that senses a temperature of the battery, and when judging that the battery needs to be warmed up, in situation (i) where the vehicle is stopped, set a q-axis current value for vector control of the motor at zero, or when a brake is released from such a situation (1), set a q-axis current at a value corresponding to a drive torque required to do a vehicle creep operation, and additionally set a d-axis current at a value required to do a battery warm-up operation. On the other hand, when the battery needs to be warmed up in situation (ii) where the vehicle is running, the controller is configured to set a q-axis current at a value corresponding to a drive torque required to do a vehicle running operation and additionally set a d-axis current at a value of promoting the battery warm-up operation in relation to the q-axis current value. In situations (i) and (ii), the controller performs setup so that the d-axis current value increases with a decrease in the battery temperature.

(2) Optionally, when the controller judges that the battery needs to be warmed up, it is preferable that the controller is configured to setup so that the d-axis current value increases with a decrease in the battery temperature, and decreases with an increase in the q-axis current value due to an increase in the required drive torque.

(3) The q-axis current value and the d-axis current value may be preset in a table in correspondence with the required drive torque and the battery temperature, or may be set so as to increase in accordance with a difference between a required heat amount and an estimated self-heating amount when the required heat amount is larger than the estimated self-heating amount. Here, the required heat amount required for battery warm-up may be calculated by the controller in accordance with the output of the battery temperature sensor, and the estimated self-heating amount of the battery may be calculated by the controller in accordance with a motor power feed amount based on the required drive torque of the motor.

(4) According to another aspect of the present invention, there is provided a vehicle that includes the control device described in (1) above or a vehicle that includes at least one of features described in (2) and (3) above in addition to a feature described in (1) above.

According to still another aspect of the present invention, the following vehicle is also provided. That is, a vehicle comprises a vector-controlled electric drive motor for vehicle, a battery to be an electrical power source for the drive motor, a controller that generates a motor drive signal required for vector control of the motor in accordance with a required drive torque for the vehicle, an inverter that controls electrical power supplied from the battery to the motor in accordance with the motor drive signal, a battery temperature sensor that senses the temperature of the battery, and a heat supplier that supplies heat generated at either or both of the drive motor and the inverter to the battery. Furthermore, the controller is configured to set a q-axis current value and a d-axis current value for the vector control in accordance with the required drive torque of the motor. Still furthermore, the controller is configured to, when judging that the battery needs to be warmed up from an output of the battery temperature sensor, calculate a heat amount required for battery warm-up in accordance with the output of the battery temperature sensor, calculate an estimated self-heating amount of the battery in accordance with a motor power feed amount based on the required drive torque of the motor, and calculate a heat supply amount indicative of the amount of heat supplied to the battery by the heat supplier. Still furthermore, the controller is configured to, when the required heat amount for the warm-up of the battery is greater than a sum of the estimated self-heating amount and the heat supply amount, correct so as to increase the d-axis current value for vector control in accordance with a magnitude of a difference between the required heat amount and the sum of the estimated self-heating amount and the heat supply amount.

According to the present invention, for example in a case of that the vehicle to be controlled is an electric vehicle, and in a situation where the battery warm-up is required for a cold start of the vehicle, the q-axis current value for vector control that is required for vehicle running (based on the required drive torque of the motor) is set while the d-axis current value is set so as to increase with a decrease in the battery temperature. Therefore, the battery warm-up can be speeded up no matter whether the electric vehicle is stopped or running. On the other hand, when the present invention is applied to a hybrid vehicle, the vehicle can run by using the electric drive motor instead of the internal combustion engine no matter whether a battery warm-up mode is selected, and permits the above-described battery warm-up. Thus, the present invention makes it possible to provide a motor control device and a vehicle that properly take the environmental considerations into account no matter whether an electric vehicle or a hybrid vehicle is to be controlled.

DETAILED DESCRIPTION OF THE EMBODIMENTS

Embodiments of the present invention will now be described with reference to the accompanying drawings.

First Embodiment

Figure 1:
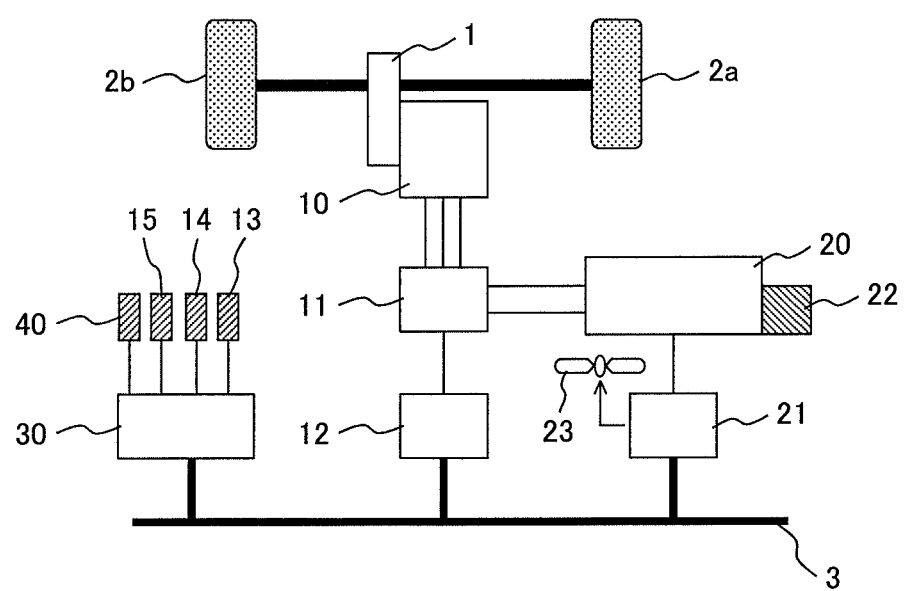
FIG. 1 is a diagram illustrating an overall configuration of a vehicle according to a first embodiment of the present invention.

FIG. 1 is a schematic diagram illustrating a vehicle with a motor control device according to a first embodiment of the present invention. As an example, an electric vehicle having a vehicle electric drive motor 10 as a drive source is shown in this schematic diagram.

The vehicle according to the first embodiment shown in FIG. 1 includes three ECUs (electronic control units): a battery ECU 21, a motor ECU (motor control device) 12 for controlling the drive motor 10, and a vehicle ECU 30 for providing overall control of the vehicle. The battery ECU 21 calculates a state of charge (SOC) based on a voltage across a battery 20 to be a vehicle power source, a charge-discharge current, and an integrated charge-discharge current, and acquires a battery temperature sensed by a battery temperature sensor 22. Thereby, the battery ECU 21 manages the charge-discharge current and other properties of the battery 20. Further, the battery ECU 21 outputs the SOC and other information about the battery 20 to another electronic control unit, such as the vehicle ECU 30, through a vehicle network 3. Moreover, the battery ECU 21 outputs an actuation signal to a battery blower fan 23 in accordance with the temperature of the battery.

The vehicle ECU 30 generates a motor control signal (a drive torque command, that is, a required drive torque), which is related to vehicle braking or vehicle driving, based on information acquired through the vehicle network 3 and signals supplied from an outside air temperature sensor 40, an accelerator pedal sensor 13, a brake pedal sensor 14, and a wheel speed sensor 15, which are connected to the vehicle ECU 30. The motor control signal generated by the vehicle ECU 30 is output to the motor ECU 12 through the vehicle network 3.

In accordance with a drive torque command from the vehicle ECU 30, the motor ECU 12 determines a voltage to be applied to the drive motor 10. For example, when a motor control signal generated as the drive torque command (the required drive torque) is input into the motor ECU 12, the motor ECU 12 calculates a q-axis current value for vector control of the motor in accordance with the required drive torque and a d-axis current value based on necessity (the d-axis current value demanded during a later-described battery warm-up operation), and calculates a voltage to be applied across the drive motor 10 from the d-axis and q-axis current. The motor ECU 12 outputs a pulse signal (PWM: pulse width modulation signal, that is, a motor drive signal), which is corresponding to the voltage to be applied across the drive motor 10, to an inverter 11. In general, a current controller (rotating frame), a rotating frame-to-rest frame converter or the like is used to convert the d-axis and q-axis current values to the pulse signals (PWM signals) to be applied to the inverter. Here, explanation as to such a conversion is not mitted because it is a well-known technology.

In accordance with the pulse width modulation signal (motor drive signal) input from the motor ECU 12, the inverter 11 converts a DC output of the battery 20 to a three-phase AC output and supplies the three-phase AC output to the drive motor 10. More specifically, the inverter 11 controls the electrical power supplied from the battery 20 as a power source to the drive motor 10 in accordance with the motor drive signal. In this manner, the drive motor 10 can generate a driving force (torque) required for vehicle drive. The driving force of the drive motor 10 is transmitted to drive wheels 2 (2a, 2b) of the vehicle through a reducer 1 so that the vehicle can run.

Incidentally, regarding temperature characteristics of a battery, it is well known that the electrical power derived from the battery is extremely reduced when the temperature of the battery is not higher than 0° C., for example. Therefore, when the vehicle is restarted after long hours of rest at a place where outdoor temperature is low, driving performance may deteriorate because of a reduction of electrical power derived from the battery. To meet such a problem, the motor ECU 12 includes a computing unit that determines (corrects) the d-axis current value for vector control in accordance with the output (battery temperature value) of the battery temperature sensor 22.

Figure 2:
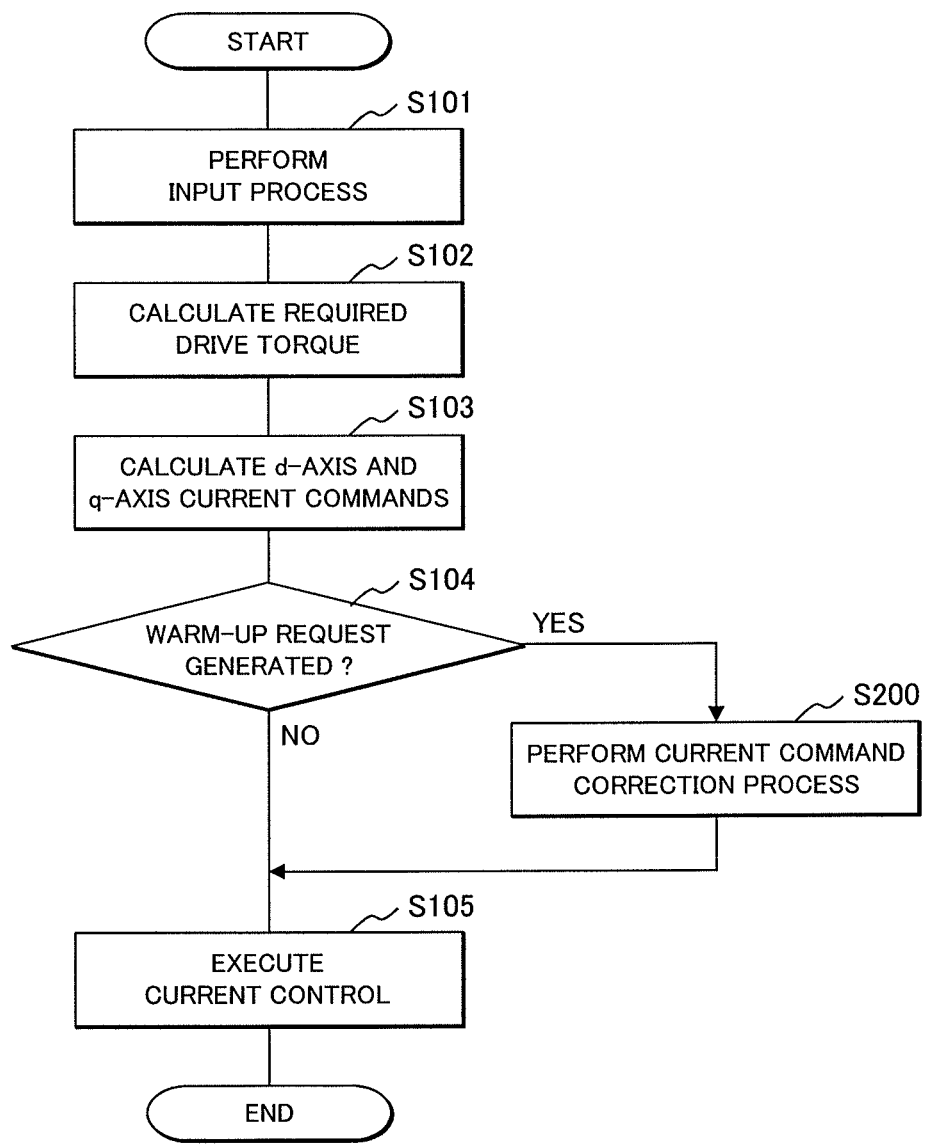
FIG. 2 is an overall flowchart illustrating a battery warm-up operation according to the first embodiment.
Figure 3:
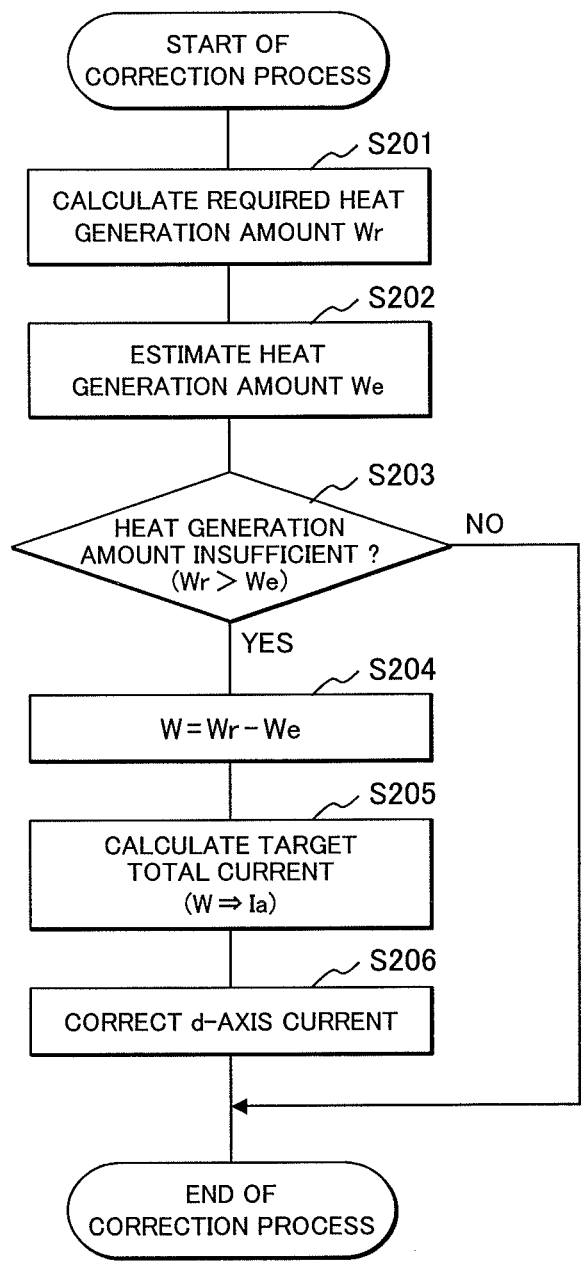
FIG. 3 is a flowchart illustrating a current correction process for the battery warm-up operation according to the first embodiment.

FIGS. 2 and 3 are flowcharts illustrating an arithmetic processing operation of current control for the drive motor 10, wherein FIG. 2 is a flowchart illustrating an overview of the arithmetic processing operation, and FIG. 3 is a flowchart illustrating a part of the arithmetic processing operation, that is, a motor current setup (current correction) process performed when battery warm-up is required.

Referring to FIG. 2, first of all, the vehicle ECU 30 performs analog-to-digital conversion of an output signal from each sensor and takes in information through the vehicle network at step S101. Next, the vehicle ECU 30 calculates a torque command (required drive torque) to be output from the drive motor 10 in accordance with a value sensed by the accelerator pedal sensor 13 and the information acquired through the vehicle network at step 102. At step S103, the motor ECU 12 receives the required drive torque (drive torque command) from the vehicle ECU 30 and calculates the q-axis current value and d-axis current value for vector control of the drive motor 10. Since a torque current component is formed by the q-axis current, the d-axis current value (magnetic flux component) to be calculated may be zero depending on the operating conditions. Next, at step S104, the vehicle ECU30 or the motor ECU 12 judges whether the battery needs to be warmed up. When, for instance, the battery temperature acquired at step S101 is not higher than a predetermined value, battery warm-up is judged at step S104 to be necessary, so that processing proceeds to step S200. On the other hand, when the judgment result obtained at step S104 indicates that battery warm-up is not required, processing proceeds to step S105. At step S105, the drive motor 10 is subjected to current control in accordance with the d-axis and q-axis current values which were calculated earlier when battery warm-up is not required. Upon completion of step S105, the process terminates.

When processing proceeds to step S200 after battery warm-up is judged at step S104 to be necessary, next steps indicated in the flowchart of FIG. 3 are sequentially performed to correct the d-axis and q-axis current values or at least the d-axis current value which were set in step S103 by the motor ECU 12.

Referring to FIG. 3, at step S201, the motor ECU 12 calculates an amount of heat required for battery warm-up (a required heat generation amount) Wr in accordance with a present battery temperature. The required heat generation amount Wr is determined by Equation (1) or Equation (2).

$$Wr = K_1(T_t - T_b) \tag{1}$$

$$Wr = K_1(T_t - T_b) + K_2(T_t - T_0) \tag{2}$$

where $T_b$ is the battery temperature, $T_t$ is a battery target temperature, $T_0$ is an outdoor air temperature, and $K_1$ and $K_2$ are factors.

Next, at step S202, the motor ETC 12 calculates estimated a self-heating amount We of the battery on condition that the drive motor is driven by using the d-axis and q-axis currents set at step S103. In other words, the estimated self-heating amount of the battery is calculated in accordance with a motor power feed amount based on the required drive torque of the drive motor. In general, a battery since has an internal resistance Ri, when a current Ia is output from the battery, a loss based on the internal resistance turns out to be heat, and the temperature of the battery rises due to its self-heating. Hence, the self-heating amount is determined by Equation (3), which is based on Joule's law. In Equation (3), t represents time.

$$We = Ia^2 Ri t \tag{3}$$

Next, at step S203, the motor ECU 12 compares between the estimated self-heating amount We and the required heat generation amount Wr which were calculated in steps S201 and S202. When the self-heating amount We is equal to or greater than the required heat generation amount Wr (Wr≦We), the battery warm-up is judged at step S203 to be unnecessary, so that such processes finishes and then go on again. In this instance, the current control at step S105 is executed by using the d-axis and q-axis currents that have been determined at step S103 and not subjected to battery warm-up correction.

Contrarily, at step S203, when the battery warm-up is judged to be necessary (Wr>We), processing proceeds to step S204.

At step S204, the motor ECU 12 calculates a difference W (=Wr−We) between the required heat generation amount and the estimated self-heating amount, and then, at step S205, a target total current Ia to be output from the battery is calculated in accordance with the difference W. The target total current Ia is a value obtained by Equation (4) taking the required drive torque of the drive motor and battery warm-up into consideration.

$$Ia = K_3(Wr - We) \tag{4}$$

where $K_3$ is a factor.

In accordance with the relationship between the d-axis current id and the q-axis current iq which are used for vector control, the target total current Ia is represented by $Ia^2 = id^2 + iq^2$. Details will be given later with reference to FIG. 4. In step S206, the d-axis current value ($i_d$) is set from the target total current Ia by using, for example, Equation (5). Upon completion of step S206, the process terminates.

$$i_d = \sqrt{I_a^2 - i_q^2} \qquad (5)$$

The above d-axis current value is one determined when it is subjected to battery warm-up correction.

The processes indicated in FIGS. 2 and 3 are repeatedly performed at predetermined intervals.

Figures 4, 5:
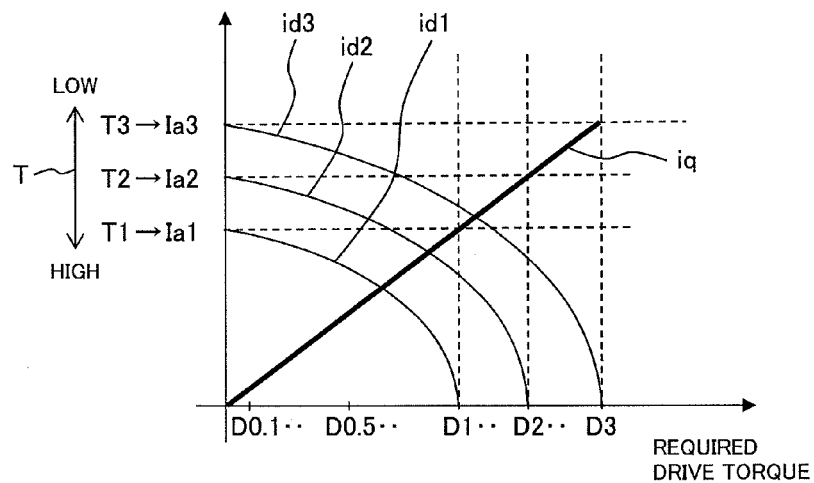
FIG. 4 is a graph illustrating a d-axis current and q-axis current for vector control, which are set in a current correction process according to an embodiment of the present invention.
FIG. 5 is diagram illustrating a table derived from the graph shown in FIG. 4.

FIG. 4 schematically shows the d-axis and q-axis current values for the required drive in relation to the target total current Ia which is set in accordance with the battery temperature.

Referring to FIG. 4, a vertical axis represents the target total current Ia which is set depending on the battery temperature T, and a horizontal axis represents the required drive torque D of the drive motor. The battery temperature T may be determined by taking the outdoor temperature into account. A symbol id represents d-axis current characteristics that are executed when motor current control (vector control) is executed in accordance with the present embodiment, whereas the symbol iq represents q-axis current characteristics. The relational expression indicating the relationship between battery temperatures T1, T2, and T3, which are indicated along the vertical axis, is T1>T2>T3. The relational expression indicating the relationship between totak currents Ia1, Ia2, and Ia3, which are determined at battery temperatures T1, T2, and T2, respectively, is Ia1<Ia2<Ia3 during a battery warm-up operation. The battery temperature Tat which battery warm-up is required is set in such a manner that the target total current Ia increases with a decrease in the battery temperature. The q-axis current value iq has linear characteristics (iq=KqD where Kq is a factor) and changes in accordance with the required drive torque D. On the other hand, the d-axis current value id gradually decreases with an increase in the required drive torque D (q-axis current value iq), as indicated by a curve (id=√(Ia² (KqD)²)), due to the relationship between the target total current Ia and the required drive torque D (q-axis current value iq) (Ia²=iq²+id²). Required drive torques D1, D2, and D3 (D1<D2<D3), which are indicated along the horizontal axis, are required drive torques that implement the battery warm-up operation by using only the q-axis current value even at battery temperatures T1, T2, and T3.

For example, when the battery temperature is T1, the target total current is set to Ia1. In this instance, the q-axis current iq is set in accordance with the required drive torque D. Then, d-axis current id1 is set in relation with the q-axis current iq. In this instance, when the required drive torque is zero (the vehicle is in a stopped state), the q-axis current value iq is zero, the d-axis current id1 is set to target total current Ia1 (id1=Ia1). When the required drive torque D is greater than zero and is smaller than the required drive torque D1, Equation (5) is used to determine d-axis current id1 from the target total current Ia1 and the q-axis current iq. When the battery temperature is lower than T1, for example, equal to T2 or T3, the target total current is set to Ia2 or Ia3 (Ia1<Ia2<Ia3). In this instance, correction is made so that the d-axis current increases with a decrease in the battery temperature even when the required drive torque D (q-axis current value) remains unchanged. Further, when the battery temperature T gradually rises during the battery warm-up operation, an employed d-axis current value characteristic curve id changes to a corresponding curve accordingly. For example, when the battery temperature rises from T3 to T2, the d-axis current value characteristic curve changes from id3 to id2.

That is, in the present embodiment, the motor ECU 12 as a controller judges whether the battery warm-up is required and, when the battery needs to be warmed up in situation (i) where the vehicle is stopped, the motor ECU 12 sets the q-axis current value iq to zero and sets a d-axis current value that permits the battery warm-up operation. On the other hand, when the battery needs to be warmed up in situation (ii) where the vehicle is running, the motor ECU 12 sets the q-axis current value iq in accordance with the drive torque D required for vehicle running and sets a d-axis current value id that promotes the battery warm-up operation in relation with the q-axis current value iq. In situations (i) and (ii), the motor ECU 12 performs setup so that the d-axis current value, which is included in the target total current Ia, increases with a decrease in the battery temperature. Further, the motor ECU 12 performs setup so that the d-axis current value decreases with an increase in the q-axis current value due to an increase in the required drive torque.

As described above, the d-axis current and q-axis current are since set in accordance with the required drive torque D of the drive motor and the temperature of the battery 20, the d-axis current value for vector control of the drive motor can be corrected for battery warm-up no matter whether the vehicle is stopped or running.

Consequently, the battery warm-up can be speeded up no matter whether an electric vehicle is stopped or running.

Further, in the present embodiment, the motor ECU 12 increases or decreases the d-axis current for vector control for correction purposes in accordance with the amount of heat required for battery warm-up, which is determined from the battery temperature, and the self-heating amount of the battery, which is determined from a power feed amount for motor drive (mainly the q-axis current for vector control). This makes it possible to provide a motor control device that permits the vehicle to run while conducting a battery warm-up operation with a high correction accuracy of the d-axis current and reduces the length of battery warm-up time in consideration of energy efficiency.

Furthermore, when a required heat generation amount can be covered by the q-axis current alone, which is mainly related to the driving force, the d-axis current does not flow. This makes it possible to reduce unnecessary energy consumption.

In the present embodiment, Equations (4) and (5) are although used to set the target total current and d-axis current for vector control, the target total current and d-axis current for vector control can alternatively be determined by tabulating the graph of FIG. 4, that is, by preparing a table that shows q-axis and d-axis current value settings in relation to the required drive torque and battery temperature as shown in FIG. 5. In this case, an interpolation method based on an iq linear function and id curve function can be additionally used as needed.

The present embodiment has been described on the assumption that the present invention is applied to an electric vehicle. However, the motor current control (d-axis current/q-axis current control) executed during battery warm-up can also be applied to the motor control device for a hybrid vehicle. In a hybrid vehicle described in Patent Document 1, the current control for the warm-up of the battery was previously executed by using the d-axis current alone while operating the internal combustion engine. On the other hand, according to the present embodiment, a hybrid vehicle motor is since controlled during a battery warm-up operation by using the configuration, flowcharts, and table shown in FIGS. 1 to 5 as needed without the internal combustion engine operation, it is possible to provide a vehicle capable of performing the battery warm-up operation no matter whether it is stopped or running while emitting no exhaust gas during a battery warm-up operation.

It should be noted that the following embodiments are also applicable to both electric vehicles and hybrid vehicles.

Second Embodiment

Figure 6:
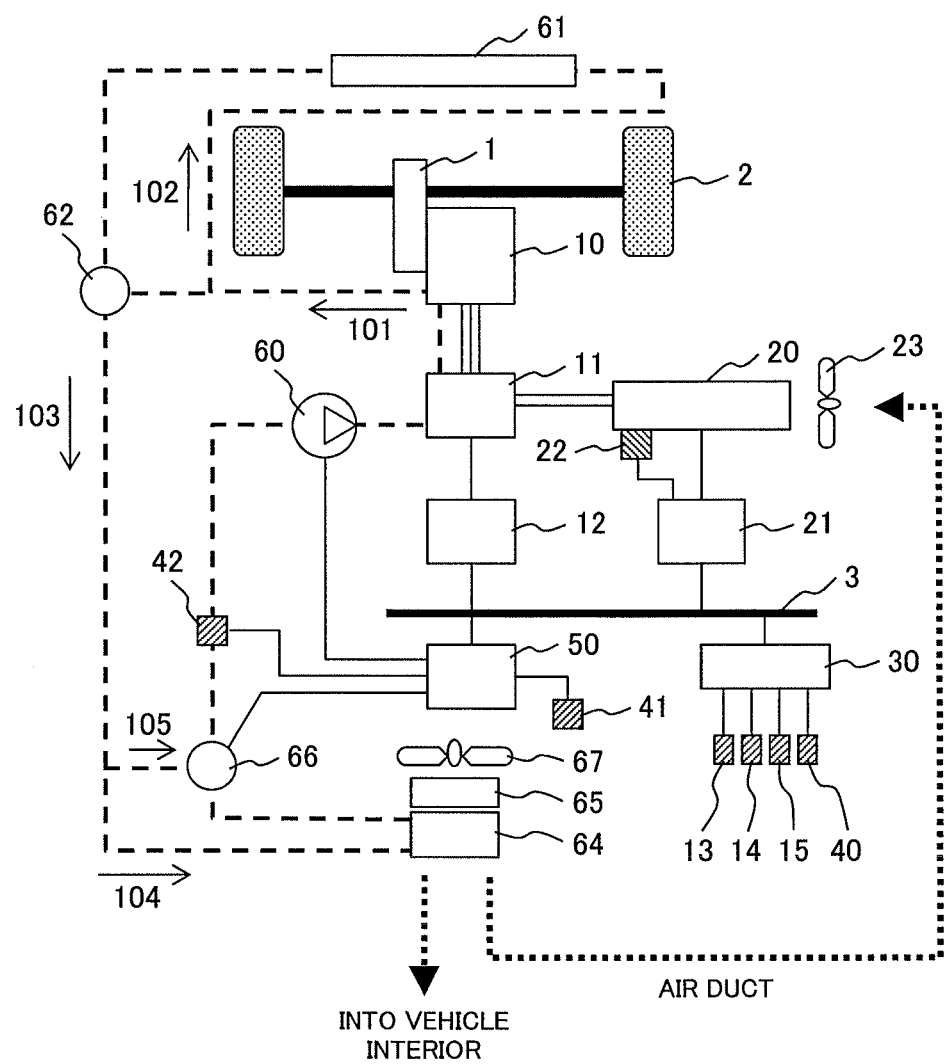
FIG. 6 is a diagram illustrating an overall configuration of a second embodiment of the present invention.

FIG. 6 is a schematic diagram illustrating a vehicle with the motor control device according to a second embodiment of the present invention. The second embodiment achieves the battery warm-up by using not only the heat derived from the battery's self-heating based on the d-axis and q-axis currents but also the heat generated by the drive motor and inverter.

In the configuration shown in FIG. 6, elements designated by the same reference numerals as those in FIG. 1 have the same functions as the corresponding elements shown in FIG. 1 and will not be redundantly described. In the second embodiment, the vehicle shown in FIG. 1 includes the battery ECU 21, the motor ECU 12, and the vehicle ECU 30, which are the same as the corresponding elements used in the first embodiment.

The present embodiment warms up the battery 20 not only by using the heat derived from the battery's self-heating based on the d-axis and q-axis currents as is the case with the first embodiment, but also by transferring the heat generated by the drive motor 10 and inverter 11 to the battery 20 through cooling water and air.

Hence, the vehicle according to the present embodiment includes a cooling water circuit (cooling system) for cooling the drive motor 10 and inverter 11 in addition to the elements shown in FIG. 1. In FIG. 6, the cooling water circuit is indicated by a broken line.

The cooling water circuit is a closed circuit in which cooling water is circulated by a water pump 60. More specifically, the water pump 60 feeds circulating cooling water to water jackets in the inverter 11 and drive motor 10. The cooling water delivered to the drive motor 10 passes through cooling water paths 101, 102 and flows into a radiator 61. The radiator 61 is a heat exchanger that cools high-temperature cooling water. The cooling water flowing in the radiator 61 is cooled by exchanging heat with outside air. The cooling water flowing out of the radiator 61 flows in a cooling water path 103.

A thermostat 62 is capable of switching from one flow path to another depending on the temperature of the cooling water. When the temperature of the cooling water is low, the thermostat 62 closes a radiator side cooling water path to let the cooling water path 101 communicate with the cooling water path 103. This ensures that no heat exchange occurs in the radiator 61. Therefore, when battery warm-up is required, the cooling water temperature can be raised immediately.

The cooling water flowing in the cooling water path 103 passes through a cooling water path 104 and then returns to the water pump 60 through a heater core 64.

The heater core 64 is a heat exchanger similar to the one included in the radiator 61. A blower fan 67 supplies air so that the heat of the cooling water is transferred to a vehicle interior through air and used as a heat source for heating the vehicle interior.

A flow path switching valve 66 switches between the cooling water path 104 and a cooling water path 105 in accordance with a signal of a temperature control unit 50. Therefore, when the vehicle interior needs to be heated while the temperature of the cooling water is low, the flow path switching valve 66 closes the cooling water path to the heater core 64 for the purposes of raising the temperature of the cooling water and preventing cool air from being unnecessarily supplied to the vehicle interior.

The heater core 64 is placed inside a vehicle air-conditioner which is placed in the vehicle interior and not shown in the figure, and disposed downstream of an evaporator 65 in terms of the flow of air supplied from the blower fan 67.

The temperature control unit 50 is an electronic control unit that provides temperature control of the cooling water and vehicle interior. The temperature control unit 50 takes in a signal from a cooling water temperature sensor 42 which senses the temperature of the cooling water, and a signal from a vehicle interior temperature sensor 41 which senses the temperature of the vehicle interior. Further, the temperature control unit 50 outputs actuation signals to the water pump 60, flow path switching valve 66, and blower fan 67 for the purpose of controlling the cooling water temperature in accordance with temperature signals, such as cooling water temperature, vehicle interior temperature, and outdoor temperature signals, and with a signal supplied from the vehicle ECU 30.

The batter blower fan 23 can transfer the heat of the cooling water to the battery 20 through air.

In the present embodiment, vector control of the drive motor 10 is also basically executed as indicated in the flowcharts of FIGS. 3 and 4. However, vector control provided by the present embodiment is slightly different from vector control provided by the first embodiment. At step 5202 for current correction processing, which is indicated in the flowchart of FIG. 3, the first embodiment determines the estimated heat generation amount We from the battery's self-heating amount. On the other hand, the present embodiment takes into account the heat generated by the drive motor 10 and inverter 11 in addition to the estimated heat generation amount We based on the battery's self-heating amount, and corrects the d-axis current value by performing processing as indicated in the flowchart of FIG. 3 although the employed configuration is specific to the present embodiment.

More specifically, when battery warm-up is judged to be required as is the case with the first embodiment, the present embodiment calculates the required heat amount Wr required for battery warm-up in accordance with the output of the battery temperature sensor 22, calculates the battery's estimated self-heating amount We in accordance with the motor power feed amount based on the required drive torque of the drive motor, and calculates the amount Wh of heat to be supplied to the battery 20 by a heat supplier (drive motor and inverter cooling water system). When the required heat amount Wr is larger than the sum of the estimated self-heating amount We and the heat supply amount Wh, the present embodiment increases the d-axis current value for vector control for correction purposes in accordance with a difference between the required heat amount Wr and the sum of the estimated self-heating amount We and the heat supply amount Wh.

The second embodiment is configured so that the heat generated by the battery's self-heating and the heat generated by the drive motor 10 and inverter 11 can be both used as a heat source for battery warm-up. This makes it possible to provide an enhanced battery warm-up capability. Further, the amount of power consumption through the use of the d-axis current can be reduced by using the heat of the cooling water. Moreover, when the heat generated from the drive motor and inverter is recovered and used for battery warm-up, the battery warm-up operation can be performed with increased efficiency because the d-axis current is controlled in accordance with the amount of heat generated from the drive motor and inverter.

Particularly, the drive motor judges, in accordance with the amount of heat remaining in an exhaust heat recovery unit (cooling water system) of the inverter, whether or not to conduct the battery warm-up operation by using the d-axis current. This makes it possible to reduce unnecessary energy consumption, for instance, during a restart.

Third Embodiment

Figure 7:
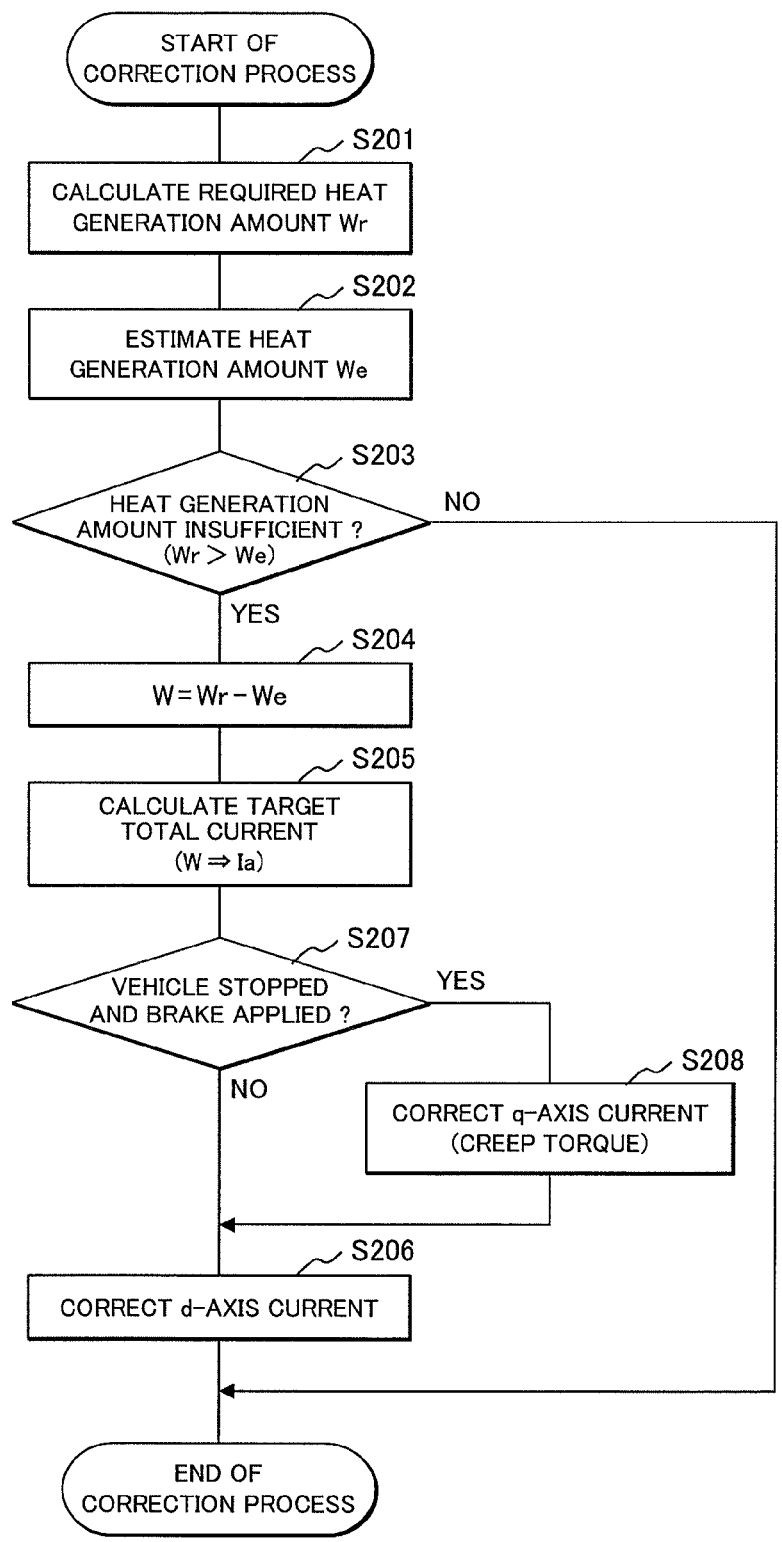
FIG. 7 is a flowchart illustrating a current correction process for the battery warm-up operation according to a third embodiment of the present invention.

FIG. 7 is a flowchart illustrating motor current control executed during a battery warm-up operation for a vehicle applied to a third embodiment of the present invention.

The vehicle according to the third embodiment has the same configuration as the vehicle according to the first embodiment. As is the case with the first embodiment, the third embodiment executes d-axis current control and q-axis current control during a battery warm-up operation in accordance with the battery temperature and the required drive torque signal. However, the third embodiment differs from the first embodiment in that, while the vehicle is stopped, the motor ECU 12 executes a battery warm-up operation by using the d-axis current without reducing the q-axis current to zero so as to set the q-axis current value corresponding to a drive torque for allowing the vehicle to creep operation with assumption that the brake is released.

The above-mentioned motor control will now be described with reference to the flowchart of FIG. 7. In the flowchart of FIG. 7, steps designated by the same step numbers as in the flowchart of FIG. 3 will not be redundantly described because they relate to a process in which the same function is executed as in the flowchart of FIG. 3.

Regarding a conventional hybrid vehicle or electric vehicle, when the vehicle is stopped and a brake pedal is depressed, its engine and drive motor is set to stop to reduce energy consumption. Contrarily, when an accelerator pedal and the brake pedal are both released, a predetermined driving force (required drive torque) is generated to let the vehicle creep. In other words, when the brake pedal is depressed while the vehicle is stopped, the electric power consumption of the drive motor 10 and inverter 11 is reduced, consequently, the amount of heat generated by the self-heating of the battery 20 decreases.

Meanwhile, according to the present embodiment, as shown in the flowchart of FIG. 7, when the battery warm-up is required and calculation process of the target total current has been executed in a not-yet-warm-up state at steps S201 to S205, a step S207 is subsequently executed to judge in accordance with a signal of the brake pedal sensor 14 (see FIG. 1) whether the brake pedal is depressed while the vehicle is stopped. The vehicle ECU 30 takes in information about a vehicle stop state from both information indicating that the depression amount of the accelerator pedal 13 shown in FIG. 1 is zero and information indicating that the speed is zero which is generated by the wheel speed sensor 15. When the judgment result obtained in step S207 does not indicate that the brake pedal is depressed while the vehicle is stopped, only the d-axis current is corrected as is the case with the process indicated in FIG. 3, and then the process terminates. On the other hand, the judgment result obtained in step S207 indicates that the brake pedal is depressed while the vehicle is stopped, the relevant information is conveyed to the motor ECU 12. The motor ECU 12 then sets a q-axis current corresponding to the drive torque for creeping, corrects the d-axis current value in step S206 in accordance with Equation (5), and terminates the process.

As described above, when the brake is depressed by a driver of the vehicle while the vehicle is stopped, the motor ECU 12 sets a q-axis current that outputs a drive torque to let the vehicle creep when the brake is released, and allows the d-axis current to flow for promoting the battery warm-up operation. This makes it possible to immediately warm-up the battery 20. The present embodiment also provides the following advantages.

At a low temperature at which battery warm-up is required, the discharge performance of the battery is not fully delivered, and the instantaneous force of the battery (the amount of current capable of being extracted instantaneously) is weaker than that at an appropriate temperature. Therefore, when, for instance, the brake is depressed to stop the vehicle and then the brake is released to depress the accelerator for acceleration, it takes a certain amount of time to extract a necessary amount of current, so that a sluggish acceleration feel may result. To meet such a problem, the present embodiment since previously generates a predetermined driving force (the required drive torque for allowing the vehicle to creep) during the vehicle is stopped while depressing the brake, in a situation where battery warm-up is required and when the brake is released to depress the accelerator, it is possible to avoid a sluggish acceleration feel and accomplish battery warm-up promptly.

In the above-described embodiments, the d-axis and q-axis current values, which are to be set by a current correction unit, are calculated in accordance with the self-heating amount of the battery 20 and the required heat amount required for battery warm-up. From the viewpoint of vehicle protection and device protection, however, corrections may be made in accordance, for instance, with the battery's state of charge (SOC) and state of health (SOH). Further, if an excessive amount of current is extracted for self-heating of the battery, the battery may deteriorate. Therefore, the amount of current to be extracted may be limited to avoid such a problem.

What is claimed is:

1. A vehicle electric drive motor-control device for executing vector control of an electric drive motor for vehicle, the control device comprising:

a controller that generates a motor drive signal of vector control for the motor in accordance with a required drive torque; and an inverter that controls electrical power supplied from a battery as an electrical power source to the motor in accordance with the motor drive signal;

wherein the controller is configured to judge whether the battery needs to be warmed up in accordance with an output of a battery temperature sensor that senses a temperature of the battery, and when judging that the battery needs to be warmed up, in situation (i) where the vehicle is stopped, set a q-axis current value for vector control of the motor at zero, or when a brake is released from such a situation (i), set a q-axis current at a value corresponding to a drive torque required to do a vehicle creep operation, and additionally set a d-axis current at a value required to do a battery warm-up operation;

the controller further is configured to, when the battery needs to be warmed up in situation (ii) where the vehicle is running, set a q-axis current at a value corresponding to a drive torque required to do a vehicle running operation and additionally set a d-axis current at a value of promoting the battery warm-up operation in relation to the q-axis current value; and wherein, in said situations (i) and (ii), the controller is configured to perform setup so that the d-axis current value increases with a decrease in the battery temperature.

2. The control device according to claim 1, wherein the controller is configured to, when judging that the battery needs to be warmed up, setup so that the d-axis current value increases with a decrease in the battery temperature, and decreases with an increase in the q-axis current value due to an increase in the required drive torque.

3. The control device according to claim 1, wherein the q-axis current value and the d-axis current value are preset in a table in correspondence with the required drive torque and the battery temperature.

4. The control device according to claim 1, wherein, the controller is configured, when judging that the battery needs to be warmed up, to calculate a required heat amount required for battery warm-up in accordance with the output of the battery temperature sensor, calculate an estimated self-heating amount of the battery in accordance with a motor power feed amount based on the required drive torque of the motor, and increase in accordance with a difference between the required heat amount and the estimated self-heating amount when the required heat amount is larger than the estimated self-heating amount.

5. A vehicle comprising:
a vector-controlled electric drive motor;
a battery that serves as an electrical power source for the drive motor;
a battery temperature sensor that senses the temperature of the battery; and
the vehicle electric drive motor-control device described in claim 1.

6. A vehicle comprising:
a vector-controlled electric drive motor for vehicle;
a battery to be an electrical power source for the drive motor;
a controller that generates a motor drive signal required for vector control of the motor in accordance with a required drive torque for the vehicle;
an inverter that controls electrical power supplied from the battery to the motor in accordance with the motor drive signal;
a battery temperature sensor that senses the temperature of the battery, and
a heat supplier that supplies heat generated at either or both of the drive motor and the inverter to the battery;
wherein the controller is configured to set a q-axis current value and a d-axis current value for the vector control in accordance with the required drive torque of the motor, and when judging that the battery needs to be warmed up from an output of the battery temperature sensor, calculate a heat amount required for battery warm-up in accordance with the output of the battery temperature sensor, calculate an estimated self-heating amount of the battery in accordance with a motor power feed amount based on the required drive torque of the motor, and calculate a heat supply amount indicative of the amount of heat supplied to the battery by the heat supplier, and
furthermore, the controller is configured to, when the required heat amount for the warm-up of the battery is greater than a sum of the estimated self-heating amount and the heat supply amount, correct so as to increase the d-axis current value for vector control in accordance with a magnitude of a difference between the required heat amount and the sum of the estimated self-heating amount and the heat supply amount.

7. The vehicle according to claim 6, wherein the vehicle is an electric vehicle, and the controller is configured to take in braking information and stop information as to the electric vehicle to be controlled, judge whether the vehicle is in a stop state with a brake applied, and when judging that the vehicle is stopped with the brake applied, not only set a q-axis current value corresponding to a drive torque for allowing the vehicle to creep operation with assumption that the brake is released while the battery is in need of warm-up, but also correct the d-axis current value.

8. The vehicle according to claim 7, wherein the controller is further configured, when the temperature of the heat supplier is equal to or greater than a predetermined value, not to correct the d-axis current value.

\* \* \* \* \*